United States Patent
Sumi et al.

(10) Patent No.: US 11,294,234 B2
(45) Date of Patent: Apr. 5, 2022

(54) DISPLAY DEVICE

(71) Applicant: InnoLux Corporation, Miao-Li County (TW)

(72) Inventors: Naoki Sumi, Miao-Li County (TW); Keiko Edo, Miao-Li County (TW); Hao-Yu Liou, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 17/002,761

(22) Filed: Aug. 25, 2020

(65) Prior Publication Data

US 2021/0208455 A1 Jul. 8, 2021

Related U.S. Application Data

(60) Provisional application No. 62/958,317, filed on Jan. 8, 2020.

(51) Int. Cl.
*G02F 1/13357* (2006.01)
*G02F 1/1362* (2006.01)
*G02B 30/32* (2020.01)
*G02F 1/1335* (2006.01)

(52) U.S. Cl.
CPC ....... *G02F 1/133606* (2013.01); *G02B 30/32* (2020.01); *G02F 1/136286* (2013.01); *G02F 1/133607* (2021.01); *G02F 2203/12* (2013.01)

(58) Field of Classification Search
CPC .... G02B 3/005; G02B 30/27; G02F 1/134336
See application file for complete search history.

(56) References Cited

U.S. PATENT DOCUMENTS

| | | | |
|---|---|---|---|
| 2009/0195642 A1* | 8/2009 | Fukushima | H04N 13/305 348/51 |
| 2011/0007390 A1* | 1/2011 | Yanamoto | H04N 13/324 359/466 |
| 2013/0307883 A1* | 11/2013 | You | G09G 3/3607 345/690 |
| 2014/0111854 A1* | 4/2014 | Kroon | H04N 13/305 359/463 |
| 2014/0153007 A1* | 6/2014 | Raymond | G02B 3/005 358/1.8 |
| 2014/0285884 A1 | 9/2014 | Raymond | |
| 2015/0181202 A1* | 6/2015 | Niu | H04N 13/257 348/54 |
| 2015/0279262 A1* | 10/2015 | Tsai | G09G 3/2003 345/88 |
| 2016/0240593 A1* | 8/2016 | Gu | H01L 27/3262 |
| 2017/0085865 A1* | 3/2017 | Sumi | H04N 13/324 |

\* cited by examiner

*Primary Examiner* — Michael H Caley
*Assistant Examiner* — Jonathan Y Jung
(74) *Attorney, Agent, or Firm* — Winston Hsu

(57) ABSTRACT

A display device includes a display panel and an optical modulator. The display panel includes a plurality of pixels. The optical modulator is disposed over the display panel and includes a plurality of optical modulation units. The optical modulator modulates light emitted from the display panel to corresponding directions. A slant angle of the optical modulator is between 45° and 90°.

14 Claims, 6 Drawing Sheets

DISPLAY DEVICE

CROSS REFERENCE TO RELATED APPLICATION

This non-provisional application claims priority of U.S. provisional application No. 62/958,317, filed on Jan. 8, 2020, included herein by reference in its entirety.

BACKGROUND OF THE DISCLOSURE

1. Field of the Disclosure

The present disclosure is related to a display device, and more particularly to a display device capable of showing the kirameki effect.

2. Description of the Prior Art

Since the display devices have been adopted in more and more fields, the requirement for better visual effects is also raised. For example, high dynamic range (HDR) displays have been developed to show high contrast images so the details in both the bright portion and the dark portion of an image can be seen. Although the HDR display is able to show images with greater brightness contrast and delivers better visual effects than the traditional display apparatus, the HDR display still has difficulty in showing the real light shining effects (the kirameki effect).

To show the real light shining effects, people may see different lighting profiles on the same object when watching the display from different viewing positions (e.g. different viewing angles). For example, some objects, such as the butterfly wings and the bubbles, can scatter the light and produce structural colors. In this case, people may see different colors and/or light intensities when looking at the object from different positions. However, the conventional display can only show the fixed reflection profile of a static scene.

SUMMARY OF THE DISCLOSURE

One embodiment of the present disclosure discloses a display device. The display device includes a display panel and an optical modulator.

The display panel includes a plurality of pixels. The optical modulator is disposed over the display panel and includes a plurality of optical modulation units. The optical modulator modulates light emitted from the display panel to corresponding directions. A slant angle of the optical modulator is between 45° and 90°.

These and other objectives of the present disclosure will no doubt become obvious to those of ordinary skill in the art after reading the following detailed description of the embodiment that is illustrated in the various figures and drawings.

DETAILED DESCRIPTION

It should be noted that the technical features in different embodiments described in the following description may be replaced, recombined, or mixed with one another to constitute another embodiment without departing from the spirit of the present disclosure.

In addition, the expressions "a first material layer is disposed on or over a second material layer" may indicate the first material layer is in direct contact with the second material layer, or the first material layer is not in direct contact with the second material layer, there being one or more intermediate layers disposed between the first material layer and the second material layer.

The terms "about", "approximately", "substantially", "roughly" may mean+/−10%, +/−5%, +/−3%, +/−2%, +/−1%, or +/−0.5% of the stated value. The stated value of the present disclosure is an approximate value. When there is no specific description, the stated value includes the meaning of "about", "approximately", "substantially", "roughly". Furthermore, the terms "a range from a first value to a second value" and "a range between a first value and a second value" mean that the range includes the first value, the second value, and other values therebetween.

Unless defined otherwise, all technical and scientific terms used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined.

Figure 1:
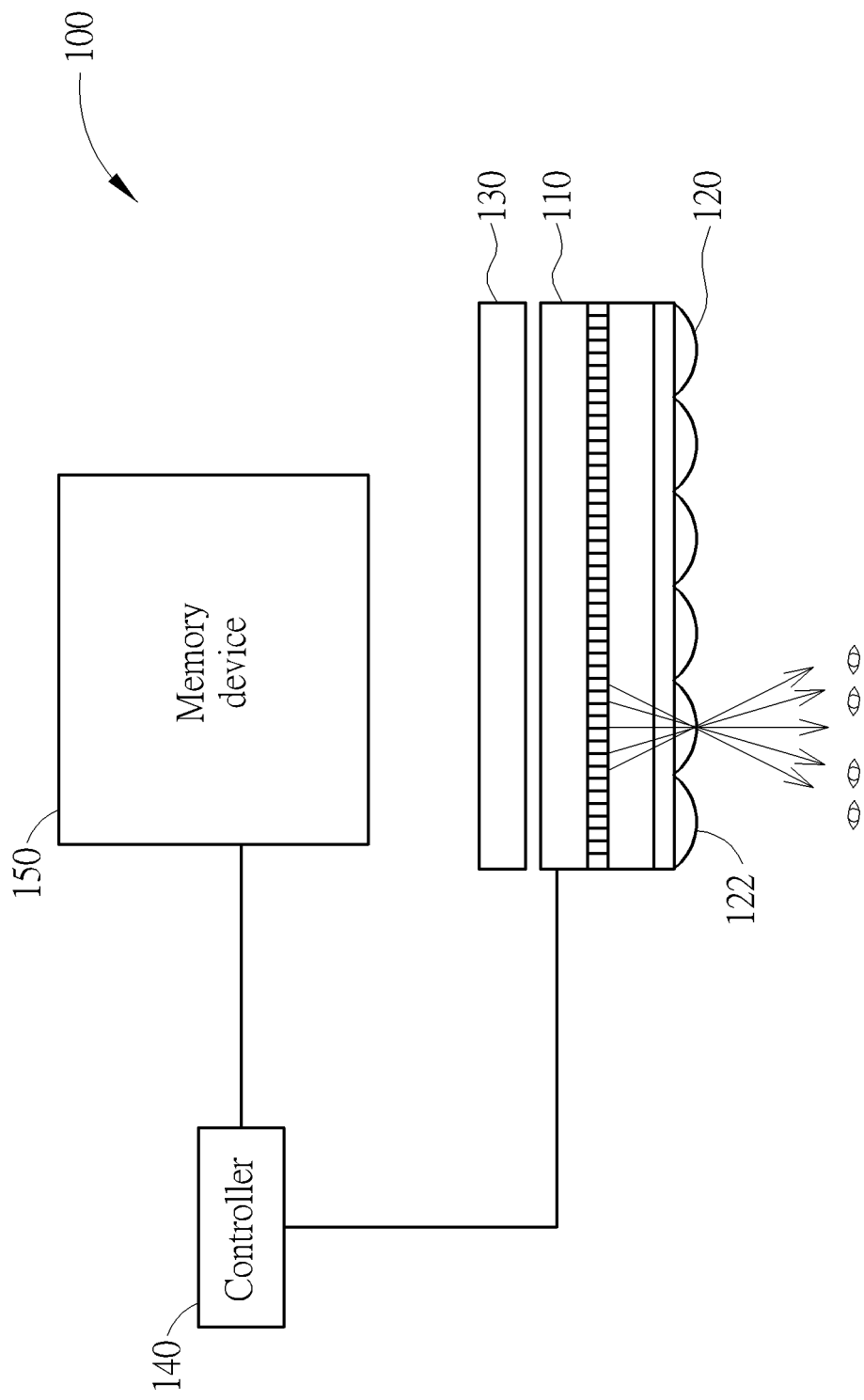
FIG. 1 shows a display device according to one embodiment.
Figure 2:
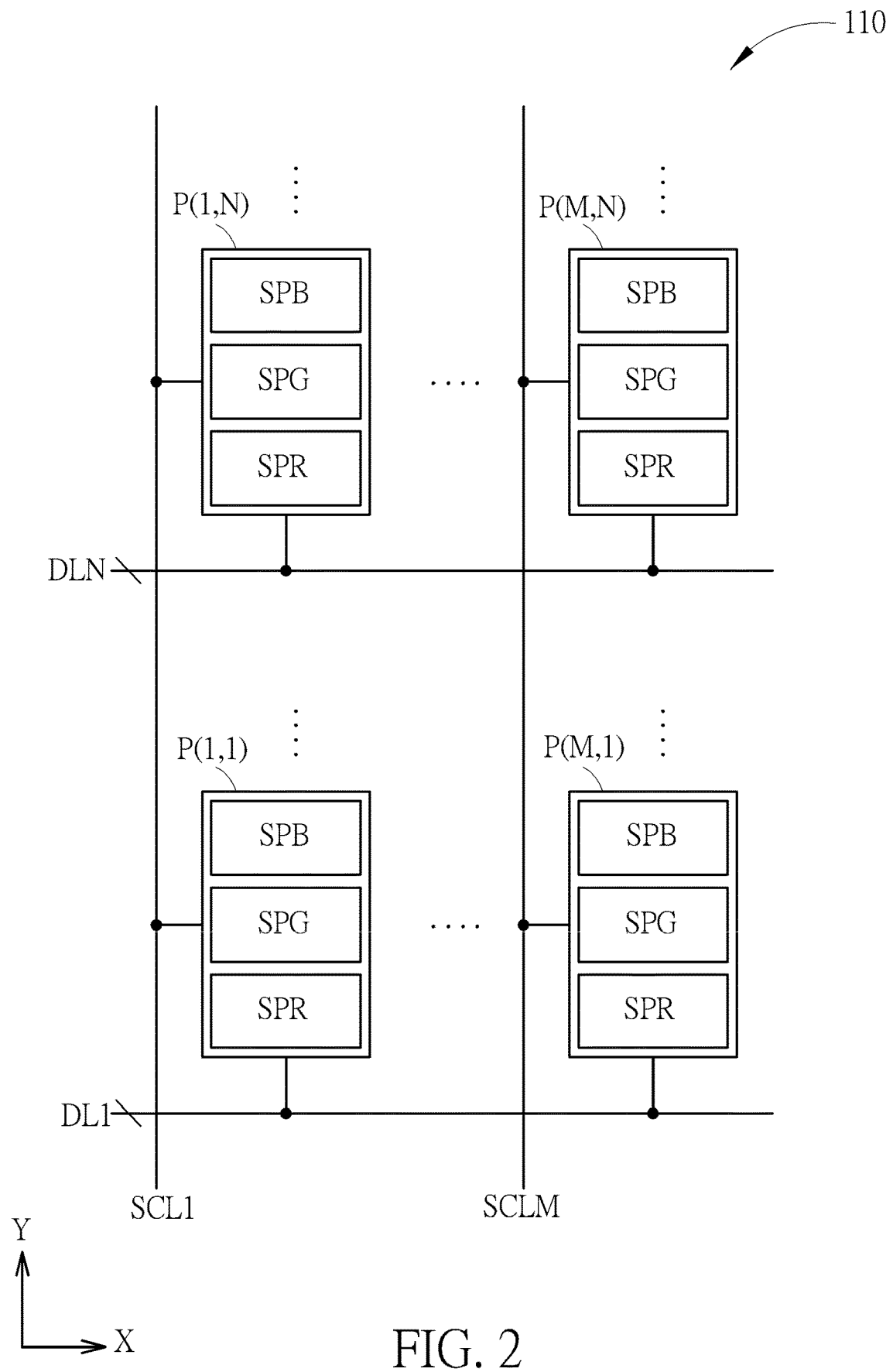
FIG. 2 shows the display panel of the display device in FIG. 1.

FIG. 1 shows a display device 100 according to one embodiment. The display device 100 may include a display panel 110 and an optical modulator 120. FIG. 2 shows the display panel 110 according to one embodiment.

In FIG. 2, the display panel 110 may include a plurality of pixels P(1,1) to P(M,N), where M and N are integers greater than 1. Also, pixels in the same column can be coupled to the same scan line for receiving a scan signal, and the pixels in the same column can be coupled to different data lines for receiving a plurality of data signals. For example, the pixels P(1,1) to P(1,N) disposed along the Y direction are in the same column and can be coupled to the scan line SCL1. However, the pixels P(1,1) to P(1,N) would be coupled to the data lines DL1 to DLN for receiving the corresponding data signals during the scan period. Similarly, the pixels P(M,1) to P(M,N) are disposed in the same column and can be coupled to the scan line SCLM. However, the pixels P(M,1) to P(M,N) would be coupled to the data lines DL1 to DLN for receiving the corresponding data signals during the scan period.

In addition, the pixels P(1,1) to P(M,1) disposed along the X direction are in the same row and can be coupled to the data line DL1 and the different scan lines SCL1 to SCLM. Similarly, the pixels P(1,N) to P(M,N) are in the same row and can be coupled to the data line DLN and the different scan lines SCL1 to SCLM.

In FIG. 1, the optical modulator 120 can be disposed over the display panel 110 and can include a plurality of optical modulation units 122. The optical modulator 120 can modulate the light emitted from the display panel 110 to corresponding directions.

In addition, the display device 100 can further include a backlight module 130 for providing backlight for the display panel 110. In some embodiments, the optical modulator 120 can be a lenticular lens, a liquid crystal gradient-index (GRIN) lens, other suitable optical film or layer, or a combination thereof. In this case, the pixels P(1,1) to P(M,N) can be disposed between the backlight module 130 and the optical modulator 120 as shown in FIG. 1. However, in some other embodiments, the optical modulator 120 can be a parallax barrier or a liquid crystal barrier. In this case, the optical modulator 120 can be disposed between the backlight module 130 and the pixels P(1,1) to P(M,N), or the pixels P(1,1) to P(M,N) can be disposed between the backlight module 130 and the optical modulator 120.

In some embodiments, the display device 100 can show the kirameki effect. That is, the display panel 110 can display images of the same scene (e.g. a static scene) with different lighting profiles corresponding to different viewing angles at the same time, and the images with different lighting profiles can be directed to different directions by the optical modulator 120. Therefore, when the viewer views the display device 100 from different angles, the viewer would see different lighting results (e.g. different light intensities and/or colors) of the same scene.

For example, in some embodiments, the display device 100 may include a controller 140 and a memory device 150. The controller 140 can generate the images of a scene with different lighting profiles corresponding to different viewing angles, and the memory device 150 can store the color information and material information of objects in the scene. In this case, the controller 140 can generate the images according to the information stored in the memory device 150, and the display panel 110 can display the images with different lighting profiles through the pixels P(1,1) to P(M,N) at the same time.

In some embodiments, the memory device 150 can further store the information of intensities and locations of the light sources in the ambient environment around the display device 100, and can store the information of the viewing vectors of the pixels P(1,1) to P(M,N) after being modulated by the optical modulator 120. Therefore, for each pixel, the controller 140 can calculate the reflection intensities to be presented according to the texture of the object surface and the position of the light sources, so the display device 100 can simulate the actual lighting effects applied to the objects of the scene, thereby presenting the kirameki effect even more realistically. However, in some other embodiments, the display device 100 may receive the image data from an image source, and may not include the controller 140 and the memory device 150.

In some embodiments, the display device 100 can be used to present the commercial goods in stores. Comparing to the landscape, the commercial goods may be more suitable to be presented as a portrait, but not limited thereto. In this case, the column of pixels P(1,1) to P(1,N) can have a greater number of pixels than a row of pixels P(1,1) to P(M,1). That is, M can be smaller than N, so the width of the display panel 110 would be smaller than the length of the display panel 110, making the display device 100 more suitable for presenting the goods or the portraits, but not limited thereto.

Figure 3:
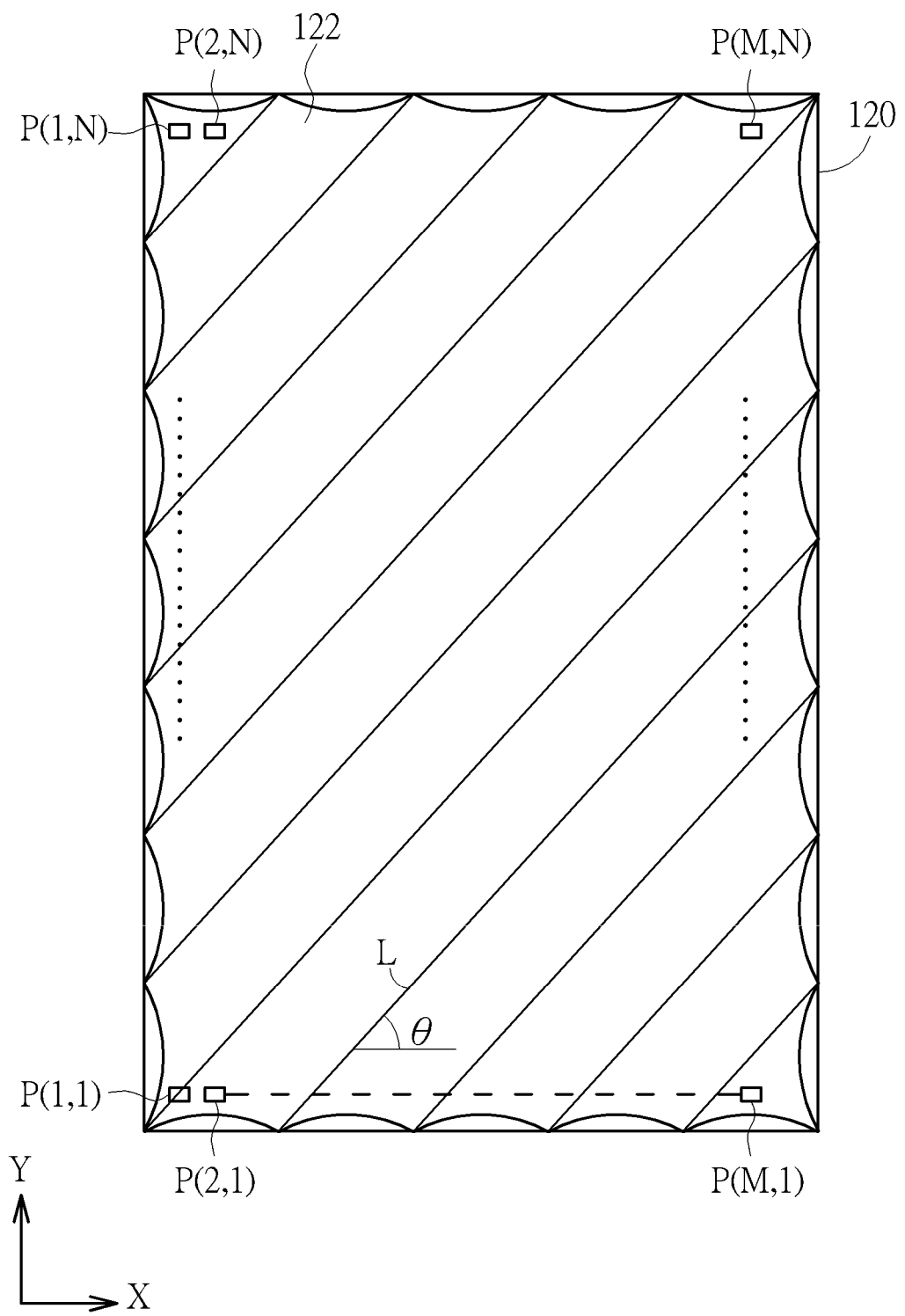
FIG. 3 shows the display panel and the optical modulator according to one embodiment.

Furthermore, to modulate the light emitted from the display panel 110 to corresponding directions within a proper field of view (FOV), the slant angle of the optical modulator 120 with respect to the display panel 110 should be properly selected. FIG. 3 shows the display panel 110 and the optical modulator 120 according to one embodiment. In FIG. 3, the slant angle $\theta$ can be defined by the angle between the row of pixels P (1,1) to P (M,1), or the X direction, and the slant edge L of the optical modulation unit 122. In some embodiments, the slant edge L can be one of the edges of the optical modulation unit 122 that are independent from the pitch of the optical modulation unit 122. Furthermore, in some embodiments, the slant angle $\theta$ can be set between 45° and 90° (45°<$\theta$<90°), such as 50°, 55°, 65°, 75° or 85°, but not limited thereto.

Figure 4:
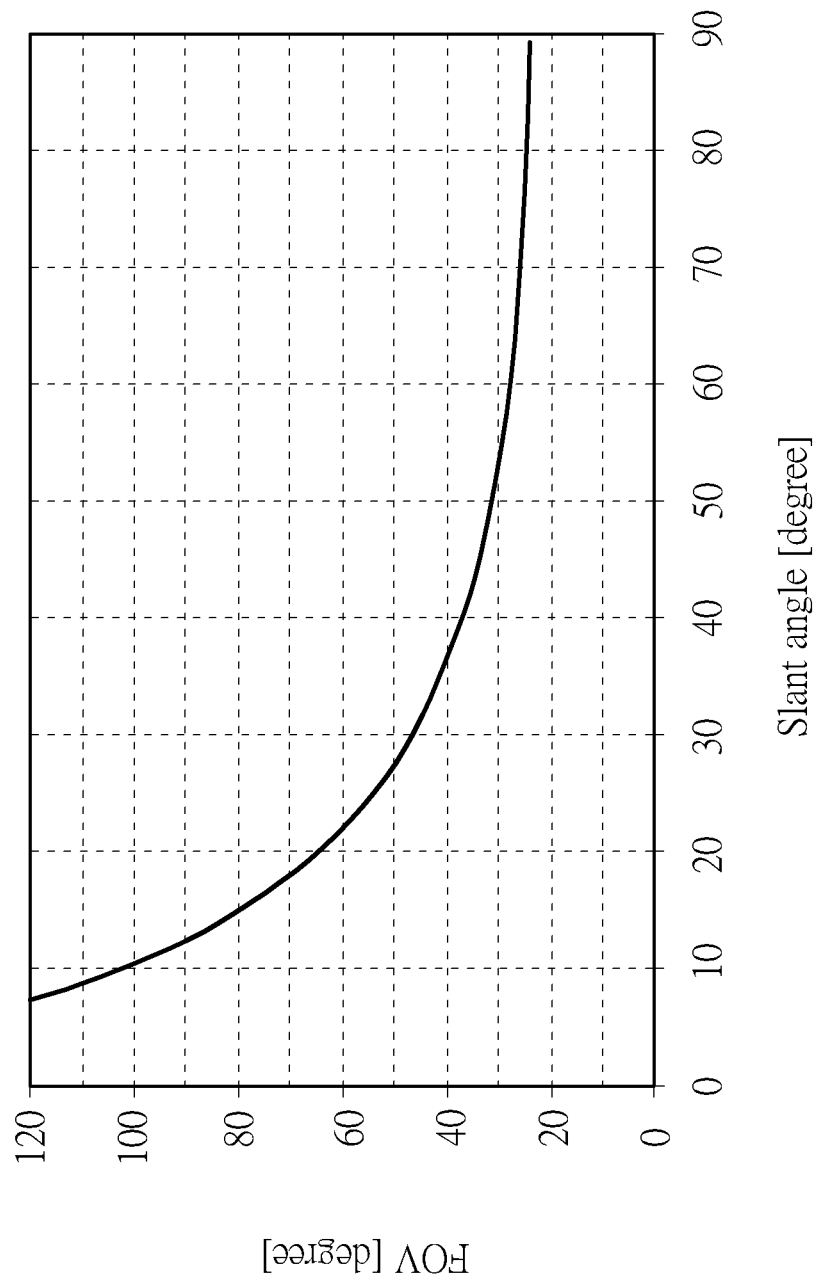
FIG. 4 shows the relation between the slant angle and the field of view provided by the optical modulator in FIG. 1.

FIG. 4 shows the relation between the slant angle $\theta$ and the field of view provided by the optical modulator 120. Generally, the wider field of view will allow the display device 100 to show a wider viewing angle; however, the image quality may become poor since the number of pixels in the display panel 110 is fixed. In some embodiments, to ensure the performance for showing the kirameki effect, the field of view (FOV) can be arranged from 20° to 40° (20°≤FOV≤40°), but not limited thereto. According to FIG. 4, to obtain such field of view, the slant angle $\theta$ should be between 45° and 90°. Furthermore, in some embodiments, the slant angle $\theta$ can be between 50° and 60° (50°≤$\theta$≤60°), such as 52°, 54° 56° or 58°, to have a better performance for showing the kirameki effect.

Another factor that can affect the performance for showing kirameki effect is the angular resolution of each optical modulation unit 122 in the optical modulator 120. The angular resolution of the optical modulation unit 122 can represent the effective number of pixels that are modulated by an optical modulation unit 122. In some embodiments, the display device 100 may have a good performance for showing the kirameki effect when the angular resolution of the optical modulation unit 122 is between 4 pixels and 8 pixels (4 pixels≤angular resolution≤8 pixels), such as 5 pixels or 6 pixels.

Figure 5:
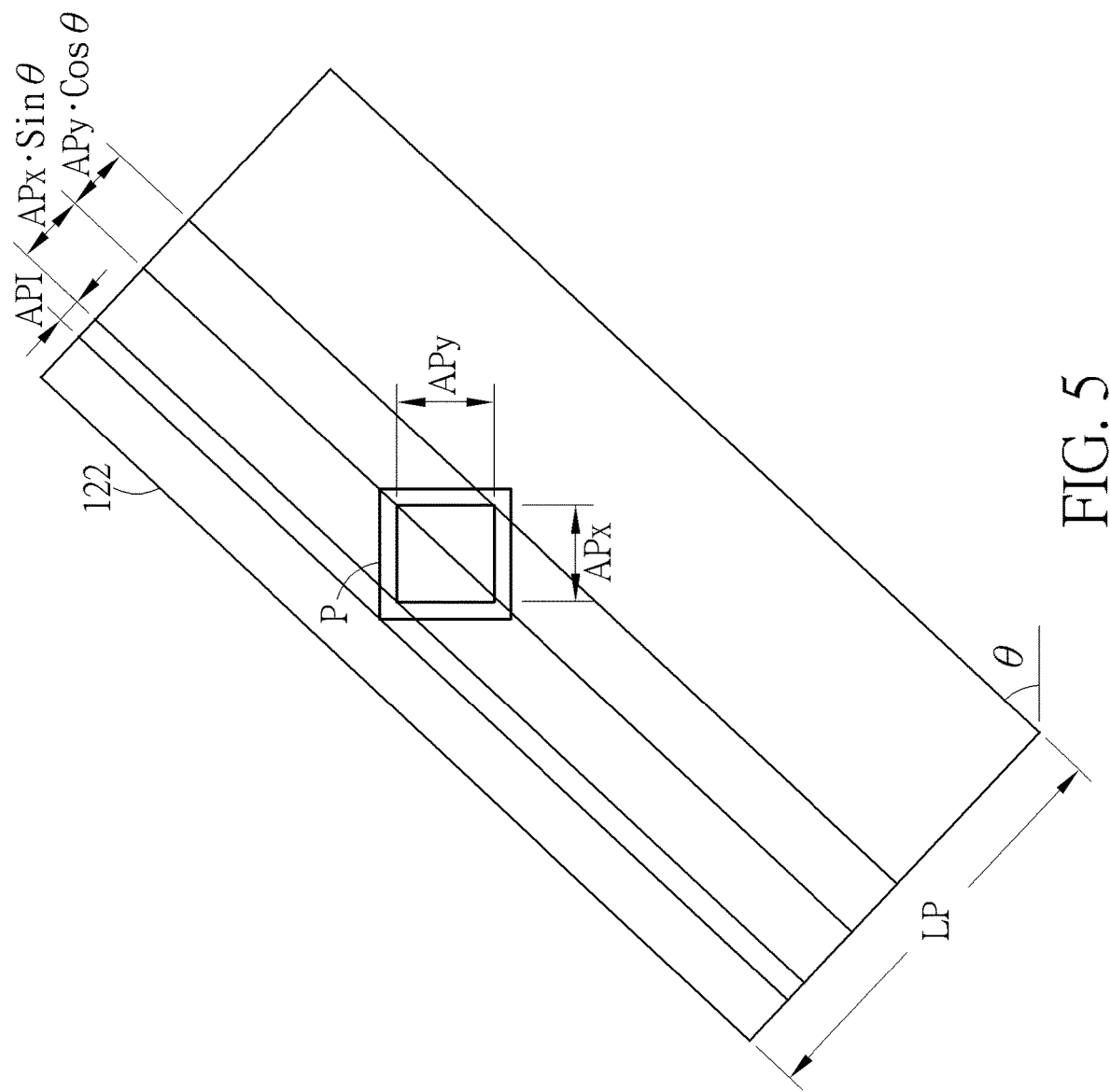
FIG. 5 shows the relation among the pixel pitch, the slant angle, and the lens pitch.

FIG. 5 shows the relation among the pixel pitch, the slant angle, and the lens pitch. In FIG. 5, the projection length of the pixel P along the pitch of the optical modulator 120 can be represented as $AP_x * \sin\theta + AP_y * \cos\theta + API$, where $AP_x$ represents the aperture size of the pixel P along the X direction, $AP_y$ represents the aperture size of the pixel P along the Y direction, and API represents the defocus width of the optical modulator 120. The aperture may be a region of the pixel P through which light passes (for example, the region may be not overlapped with light shielding component(s)), but not limited thereto. Therefore, the angular resolution can be calculated by dividing the pitch of the optical modulator 120 by the projection length of the pixel P. That is, the angular resolution limit function can be derived as $LP/(AP_x * \sin\theta + AP_y * \cos\theta + API)$, where LP is the pitch of the optical modulator 120, such as a width of the optical modulation unit 122, but not limited thereto.

In this case, to obtain the desired angular resolution between 4 pixels and 8 pixels, the pitch of the optical modulator 120 can be more than 2.7 times a width of the pixel P (such as 3 times, 4 times, 8 times, 16 times, 32 times or 64 times, but not limited thereto) along the X direction with the slant angle $\theta$ being greater than 45°. Also, as shown by the angular resolution limit function, in addition to the pitch of the optical modulator 120, the angular resolution is also related to the aperture size of the pixel P. Therefore, in some embodiments, the designer may also select a proper aperture ratio for the pixels P(1,1) to P(M,N) to comply with the selected optical modulator 120 and obtain the desired angular resolution.

Furthermore, in some embodiments, since the slant angle θ should be greater than 45°, the aperture size $AP_x$ of the pixel P along the X direction may have greater influence than the aperture size $AP_y$ of the pixel P along the Y direction in terms of the angular resolution. Therefore, the designer may consider adjusting the aperture size $AP_x$ of the pixel P along the X direction first when determining the proper aperture ratios of the pixels P(1,1) to P(M,N). For example, the pitch of the pixel P along the X direction can be designed to be smaller than the pitch of the pixel P along the Y direction. In this case, the aperture size $AP_x$ may be smaller than the aperture size $AP_y$, but not limited thereto, and the angular resolution can be increased. In some embodiments, the aperture size $AP_x$ of the present disclosure may be smaller than the conventional square grid pixel layout, but not limited thereto. In some embodiments, the aperture ratio of the pixels P(1,1) to P(M,N) along the X direction can be set to be smaller than or equal to 0.7 of the pitch of the pixel P along the X direction and greater than 0 (0<aperture ratio 0.7), such as 0.3, 0.5, or 0.6, but not limited thereto. However, in some embodiments, the aperture ratio along the Y direction may also be adjusted according to the system requirement.

In FIG. 2, each of the pixels P(1,1) to P(M,N) can include sub-pixels SPR, SPG, and SPB, for example but not limited to, the red sub-pixel SPR, the green sub-pixel SPG, and the blue sub-pixel SPB. In this case, each of the data lines DL1 to DLN may actually include multiple lines for transmitting data signals of different colors to the corresponding sub-pixels. Also, in some embodiments, each of the pixels P(1,1) to P(M,N) may include sub-pixels of other colors, such as white sub-pixel and/or yellow sub-pixel.

Figure 6:
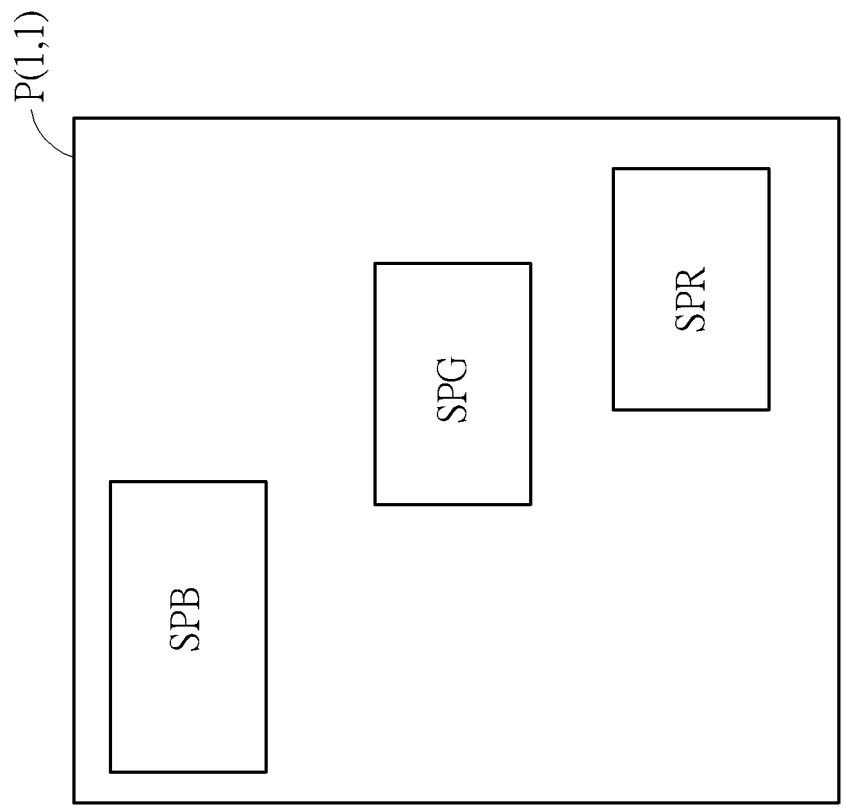
FIG. 6 shows an arrangement of the sub-pixels of the pixel according to one embodiment.

In some embodiments, the sub-pixels of each pixels P(1,1) to P(M,N) can be disposed along the Y direction. In this case, the aperture centers of the sub-pixels of each pixels P(1,1) to P(M,N) can have position offsets along the X direction. FIG. 6 shows an arrangement of the sub-pixels of the pixel P(1,1) according to one embodiment.

In FIG. 6, the red sub-pixel SPR, the green sub-pixel SPG, and the blue sub-pixel SPB are disposed along the Y direction but with a descending manner along the X direction. In this case, with the descending arrangement of the sub-pixels that is crossing to the extending direction of the slant edges of the optical modulation units 122, the light emitted by the red sub-pixel SPR, the green sub-pixel SPG, and the blue sub-pixel SPB of the pixel P(1,1) can be directed to the different direction by the optical modulator 120 randomly, ensuring that the red sub-pixel SPR, the green sub-pixel SPG, and the blue sub-pixel SPB can be used to present the substantially uniform color intensities of red, green and blue in the same viewing angle image even when the slant angle θ is greater than 45°. Consequently, the issues of color edge and/or stripe mura caused by the greater slant angle can be eased. It is noted that the arrangement of the red, green, and blue sub-pixels in one pixel P in FIGS. 2 and 6 is only for exemplary illustration, and the arrangement is not limited thereto, for example, any two of the positions of the red, green and blue sub-pixels may be switched.

Furthermore, in some embodiments, the position offsets of the aperture centers of the sub-pixels can be different. For example, in FIG. 6, the blue sub-pixel SPB can have a greater aperture. In this case, the position offset between the aperture centers of red sub-pixel SPR and the green sub-pixel SPG can be smaller than position offset between aperture centers of the green sub-pixel SPG and the blue sub-pixel SPB, ensuring that the light emitted by the red sub-pixel SPR, the green sub-pixel SPG, and the blue sub-pixel SPB can be directed to the different direction by the optical module 120 more efficiently. In some embodiments, the pixel pitch in Y direction may be less than the pixel pitch in X direction, but not limited thereto.

In summary, the display device provided by the embodiment of the present disclosure can show the images of the same scene with different lighting profiles corresponding to different viewing angles at the same time, so the viewer can experience the kirameki effect when the viewer moves as watching the display device. Furthermore, by setting the slant angle of the optical modulator between 45° and 90°, the display device can be even more suitable for presenting objects in a portrait format.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A display device comprising:
   a display panel comprising a plurality of pixels, wherein one of the pixels comprises:
   a first sub-pixel;
   a second sub-pixel; and
   a third sub-pixel; and
   an optical modulator disposed over the display panel and comprising a plurality of optical modulation units;
   wherein a slant angle of the optical modulator is between 45° and 90°, the first sub-pixel, the second sub-pixel, and third sub-pixel are disposed with a descending manner, and a position offset between the aperture centers of the first sub-pixel and second sub-pixel is smaller than a position offset between the aperture centers of the second sub-pixel and the third sub-pixel.

2. The display device of claim 1, wherein:
   pixels in a same column are coupled to a same scan line for receiving a scan signal; and
   the pixels in the same column are coupled to a plurality of different data lines for receiving a plurality of data signals.

3. The display device of claim 1, wherein:
   a row of pixels has a smaller number of pixels than a column of pixels of the plurality of pixels.

4. The display device of claim 1, wherein the slant angle is between 50° and 60°.

5. The display device of claim 1, wherein a pitch of the optical modulator is more than 2.7 times a width of a pixel of the plurality of pixels.

6. The display device of claim 1, wherein an angular resolution of an optical modulation unit of the plurality of optical modulation units is between 4 pixels and 8 pixels.

7. The display device of claim 1, wherein an aperture ratio of at least one of the plurality of pixels is smaller than or equal to 0.7.

8. The display device of claim 1, wherein:
   a column of pixels is disposed along a first direction; and
   each of the plurality of pixels comprises a plurality of sub-pixels disposed along the first direction.

9. The display device of claim 8, wherein:
   aperture centers of the plurality of sub-pixels have position offsets along a second direction perpendicular to the first direction.

10. The display device of claim 8, wherein:
    a pitch of a pixel of the plurality of pixels along the second direction is smaller than a pitch of the pixel along a first direction perpendicular to the first direction.

11. The display device of claim 1, wherein the optical modulator is a lenticular lens or a liquid crystal gradient-index (GRIN) lens.

12. The display device of claim 11, wherein the plurality of pixels is disposed between a backlight module and the optical modulator.

13. The display device of claim 1, wherein the optical modulator is a parallax barrier or a liquid crystal barrier.

14. The display device of claim 13, wherein the optical modulator is disposed between a backlight module and the plurality of pixels or the plurality of pixels is disposed between the backlight module and optical modulator.

* * * * *